UNITED STATES PATENT OFFICE.

LOUIS LANSZWEERT, OF SAN FRANCISCO, CALIFORNIA.

IMPROVED COMPOSITION FOR FRICTION-MATCHES.

Specification forming part of Letters Patent No. 50,370, dated October 10, 1865.

*To all whom it may concern:*

Be it known that I, LOUIS LANSZWEERT, of San Francisco, in the county of San Francisco and State of California, have invented a new and Improved Match Compound; and I do hereby declare that the following is a full, clear, and exact description thereof, which will enable those skilled in the art to make and use the same.

This invention relates to a match compound which is not liable to be injured by the influence of moisture, and which will produce a match that ignites on a peculiarly-prepared friction-surface.

The compound is made of adhesive cement, prepared by dissolving in a water bath white glue and nitrate of lead, to which is added a solution of benzoin in alcohol. The proportion in which these ingredients are mixed together is about as follows: white glue, three pounds; water, two pounds; nitrate of lead, one pound; alcohol, one pound; gum-benzoin, ten grains. The glue is first dissolved in one part of water, and to it is added a solution of the nitrate of lead dissolved in the other part, and while the mixture is still luke-warm the solution of benzoin in alcohol is added.

The cement obtained by these means is mixed with the following ingredients, viz: chlorate of potassa, hypophosphate of lead, nitrate of lead, and ground glass; and these ingredients are mixed together in about the following proportion: To four parts of the above-named cement I add chlorate of potassa, sixty parts; hypophosphate of lead, thirty parts; nitrate of lead, twelve parts; ground glass, one part. In order to give to this mixture the consistence of thick cream, some water may be added, thus forming a paste capable of adhering firmly to the sticks and form a head of the requisite size.

The sticks are made of wood, in any desirable form or size, as they are saturated or coated with paraffine, stearine, or any other resinous substance such as commonly used for this purpose in the manufacture of matches.

In order to preserve the head of the matches against the influence of moisture, I expose the matches prepared, as above stated, to the influence of sulphureted-hydrogen gas, whereby a thin coat of sulphuret of lead is formed, which protects the matches against the influence of moisture, and which also improves the igniting-power of the match. The matches so prepared will only ignite on a certain prepared surface, of which the principal base is one of the well-known metallic sulphides or red or amorphus phosphorus. Said friction-surface may be composed as follows: water, three-fourths of a pound; glue, three ounces; amorphus phosphorus, four and one-fourth ounces; black antimony, three ounces.

What I claim as new, and desire to secure by Letters Patent, is—

The within-described match compound, made of the ingredients above set forth, free from phosphorus and sulphur, substantially as specified.

LOUIS LANSZWEERT.

Witnesses:
H. S. HOMANS,
J. N. HOMANS.